(12) United States Patent
Obilisetty

(10) Patent No.: US 7,558,735 B1
(45) Date of Patent: Jul. 7, 2009

(54) TRANSCRIPTION APPLICATION INFRASTRUCTURE AND METHODOLOGY

(75) Inventor: Sridhar Obilisetty, Milpitas, CA (US)

(73) Assignee: Vianeta Communication, Milpitas, CA (US)

( * ) Notice: Subject to any disclaimer, the term of this patent is extended or adjusted under 35 U.S.C. 154(b) by 926 days.

(21) Appl. No.: 09/752,246

(22) Filed: Dec. 28, 2000

(51) Int. Cl.
*G10L 11/00* (2006.01)
*H04M 1/64* (2006.01)
*G06F 3/16* (2006.01)

(52) U.S. Cl. ............... 704/270.1; 704/270; 379/88.01; 715/727; 705/8

(58) Field of Classification Search ............... 704/270.1, 704/235, 219; 709/217; 369/25, 24
See application file for complete search history.

(56) References Cited

U.S. PATENT DOCUMENTS

| | | | | |
|---|---|---|---|---|
| 5,875,436 A | * | 2/1999 | Kikinis | 705/34 |
| 6,122,614 A | * | 9/2000 | Kahn et al. | 704/235 |
| 6,175,822 B1 | * | 1/2001 | Jones | 704/270 |
| 6,259,657 B1 | * | 7/2001 | Swinney | 704/270 |
| 6,298,326 B1 | * | 10/2001 | Feller | 704/270 |
| 6,408,330 B1 | * | 6/2002 | DeLaHuerga | 709/217 |
| 6,604,124 B1 | * | 8/2003 | Archbold | 718/103 |
| 6,697,841 B1 | * | 2/2004 | Sheffield et al. | 709/206 |
| 6,738,784 B1 | * | 5/2004 | Howes | 707/104.1 |
| 6,980,953 B1 | * | 12/2005 | Kanevsky et al. | 704/235 |
| 2004/0204938 A1 | * | 10/2004 | Wolfe et al. | 704/235 |

* cited by examiner

*Primary Examiner*—David R Hudspeth
*Assistant Examiner*—Brian L Albertalli
(74) *Attorney, Agent, or Firm*—Townsend and Townsend and Crew LLP (57) ABSTRACT

A method and system for capturing and transcribing dictated information and for delivering the transcribed information to an end user. A voice file containing a digital recording of the dictated information is received via the Internet from a remote device. The voice file is forwarded via the Internet to a remote transcription service provider. The transcribed information is received from the transcription service provider and in turn delivered to, for example, a facsimile machine, a text server and/or printer, a computer system or Web browser. The need for expensive dictation equipment is reduced or eliminated. In addition, the system can be readily scaled up to accommodate more users without a commensurate increase in costs.

27 Claims, 8 Drawing Sheets

TRANSCRIPTION APPLICATION INFRASTRUCTURE AND METHODOLOGY

TECHNICAL FIELD

The present invention relates to the electronic transfer of information over a network of communicatively coupled devices. More specifically, the present invention pertains to the capture and transcription of dictated information, and to the distribution of the transcribed information, using the Internet.

BACKGROUND ART

When a doctor (generally speaking, a health professional) provides medical services for a patient, the doctor is required to document his/her observations and other relevant information. In some cases, the doctor writes down his/her notes in the patient's file, or perhaps a report is typed by either the doctor or a member of the doctor's staff. However, because of busy schedules and heavy patient loads, most doctors opt instead to dictate (record) an oral report that is subsequently transcribed into a written (typed) report.

Figure 1:
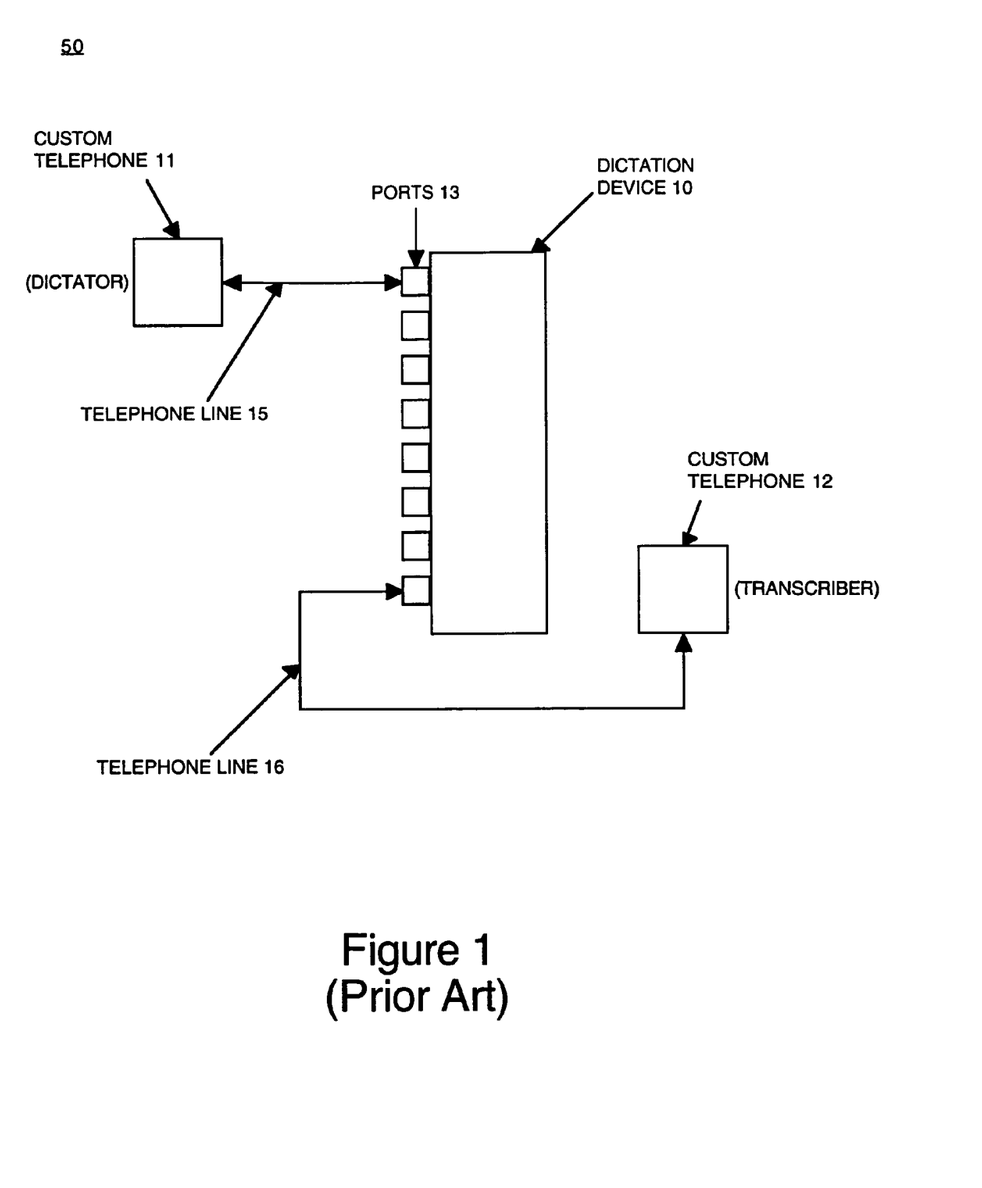
FIG. 1 is a block diagram of an exemplary prior art system for transcribing information such as medical records.

Prior Art FIG. 1 is a block diagram illustrating a typical system 50 used for medical transcription. Central to system 50 is a dictation device 10 which is used for recording dictated information. Dictation device 10 has a number of ports 13 for receiving incoming calls. The person dictating information places a call over telephone line 15 into one of the ports 13 of dictation device 10. Similarly, the person who will transcribe the recorded information places a call over telephone line 16 into another one of the ports 13 of dictation device 10. Thus, ports 13 are utilized by those users (dictators) wishing to record information as well as those users (transcribers) who will transcribe the recorded information.

Typically, the dictator and the transcriber use custom telephones 11 and 12 when accessing dictation device 10. The telephones 11 and 12 generally incorporate special features and functions that facilitate communication with dictation device 10. Other special equipment appurtenant to telephones 11 and 12, such as foot pedals, may also be required for recording or transcribing information to and from dictation device 10. Therefore, one disadvantage to the prior art is that users generally need to purchase extra, and perhaps costly, equipment in order to properly communicate with dictation device 10.

Multiple people can access dictation device 10 at the same time, either to record information or to retrieve recorded information for transcription. However, the number of people who can access dictation device 10 at any one time is limited by the number of ports 13. In one implementation, dictation device 10 has 48 ports. Thus, if 40 of the ports are being used by dictators, for example, then only eight ports are available for transcribers.

The prior art system for transcribing information such as medical records has several disadvantages. Foremost, prior art systems exemplified by system 50 are expensive to equip, operate and maintain. Because devices such as dictation device 10 have a limited number of ports 13, multiple devices are often needed in order to accommodate the number of dictators and transcribers that need to use them. Dictation devices are expensive, and therefore the cost of purchasing a sufficient number of such machines can be very high. As the number of users increases, more dictation devices are needed, further increasing capital expenditures.

Furthermore, the cost of maintaining dictation devices can also be very high. While in the simplest sense dictation device 10 functions similar to a tape recorder, in reality dictation devices are relatively complex machines having a number of components for facilitating the dictation process, and for enabling the retrieval of dictated information by transcribers. Even reliable machines require routine maintenance, and with the complexity of dictation devices, maintenance costs may be unacceptably high, especially when repairs are needed.

In addition, in the prior art, upgrading or updating the dictation devices is difficult and inconvenient. With the need to have multiple dictation devices, if there is a need for an update or upgrade, each device must be individually modified. An inordinate amount of time, with commensurate costs, is spent repeating the modification for each dictation device 10 in use.

Operating costs associated with prior art transcription systems are also relatively high. Space for housing the dictation devices is needed. In addition, there are telephony costs associated with connecting to the dictation device. In the field of medical transcription, many transcribers work from a remote location such as their home. Consequently, they will make frequent and lengthy long distance calls to the dictation device in order to listen to the recorded information while they transcribe it. The cost of such calls, even when toll free or over leased lines, can be quite high.

Accordingly, what is needed is a method and/or system that can reduce the costs associated with the purchase, operation and maintenance of prior art dictation devices and appurtenant equipment. What is also needed is a method and/or system that can address the above need and that can accommodate a large and growing number of users without substantial additional costs. The present invention provides a novel solution to the above needs.

DISCLOSURE OF THE INVENTION

The present invention provides a method and system that can reduce the costs associated with the purchase, operation and maintenance of prior art dictation devices and appurtenant equipment. The present invention also provides a method and system that can address the above need and that can accommodate a large and growing number of users without substantial additional costs.

The present embodiment of the present invention pertains to a method and system thereof for capturing and transcribing dictated information and for delivering the transcribed information to an end user. In a preferred embodiment, the information pertains to medical records, such as the records generated by health professionals with regard to patient visits. However, the present invention is well-suited for other types of uses, such as transcription of courtroom records as well as other types of recorded voice messages.

In the present embodiment, a voice file containing a digital recording of the dictated information is received via the Internet from a remote device. The voice file is forwarded via the Internet to a remote transcription service provider. The transcribed information is received from the transcription service provider and in turn delivered to, for example, a facsimile machine, a text server and/or printer, a computer system or Web browser.

In one embodiment, the transcription process of the present invention is initiated with a telephone connection to, for example, an intelligent communication server (ICS) operated by a Common (or Competitive) Local Exchange Carrier (CLEC). Using the Internet, a server computer system on the World Wide Web (WWW) is notified by the ICS of the telephone connection. The server provides instructions to the ICS for conducting the dictation session; for example, the instructions can identify user preferences and set up protocols and prompts based on those preferences. The dictated information is recorded and digitized in a voice file that is sent to the server via the Internet. In this embodiment, a larger number of users (including users who are recording as well as users who are transcribing) can be accommodated; because a conventional dictation service is not used, there will not be a limitation imposed by the number of available ports. Furthermore, the system of the present invention can be readily expanded to accommodate additional users.

In another embodiment, dictation is captured over a phone connection to a legacy dictation system and digitized in a voice file. However, the dictation system is modified to send the voice file to the server via the Internet. Consequently, transcribers do not need to tie up ports on the dictation system in order to access the recorded information, thereby freeing up ports for recording.

In each of the above embodiments, the server sends the voice files via the Internet to a transcription service provider. The transcription service provider returns to the server a transcript file providing a transcribed version of the voice file. The voice files can be automatically downloaded to the transcription service provider, and the transcript files can be automatically uploaded to the server. In one embodiment, statistics characterizing the performance of the transcription service are generated. For example, the amount of recorded information waiting to be transcribed, the amount of time needed to transcribe each voice file, and other such information can be measured and summarized. Furthermore, alerts and notifications can be generated in case the time for completing a transcription is approaching the expected delivery time. In addition, the status of a voice file can be determined by accessing a Web page on the server.

In one embodiment of the present invention, the transcribed information is returned to the server for distribution to the end user. The transcribed information can be provided to the end user in a variety of different ways. In one embodiment, the transcribed information can be sent to a facsimile machine. In another embodiment, the transcribed information can be sent to a text server or a printer for printing. In yet another embodiment, the transcribed information can be displayed on a computer system. In one more embodiment, the transcribed information can be displayed on a Web page. Complementary to these embodiments, the voice file can also be sent to a device that has the capability to make the voice file audible to a user. As such, the user can listen to the voice file while reviewing (e.g., proofreading) a printed or displayed version of the transcribed information.

In summary, in accordance with the present invention, expensive dictation equipment, as well as the high costs associated with operating and maintaining that equipment, can be eliminated or reduced. In addition, costs can be further reduced by eliminating telephony expenditures associated with transcriber access to legacy dictation devices. Moreover, because conventional dictation devices are not needed, the number of users that can dictate information at the same time is not limited by the number of ports available on such devices; therefore, a much larger number of users can dictate information at the same time. On the other hand, should legacy dictation devices continue to be used, their effectiveness can be enhanced because transcribers do not need to access these devices by telephone to retrieve the recorded information. As a result, a greater number of ports will be made available for dictation, thereby accommodating a greater number of users.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "sending," "providing," "updating," "digitizing," "communicating," "generating," "monitoring" or the like, refer to actions and processes (e.g., processes 500 and 600 of FIGS. 5A, 5B and 6, respectively) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Figure 2:
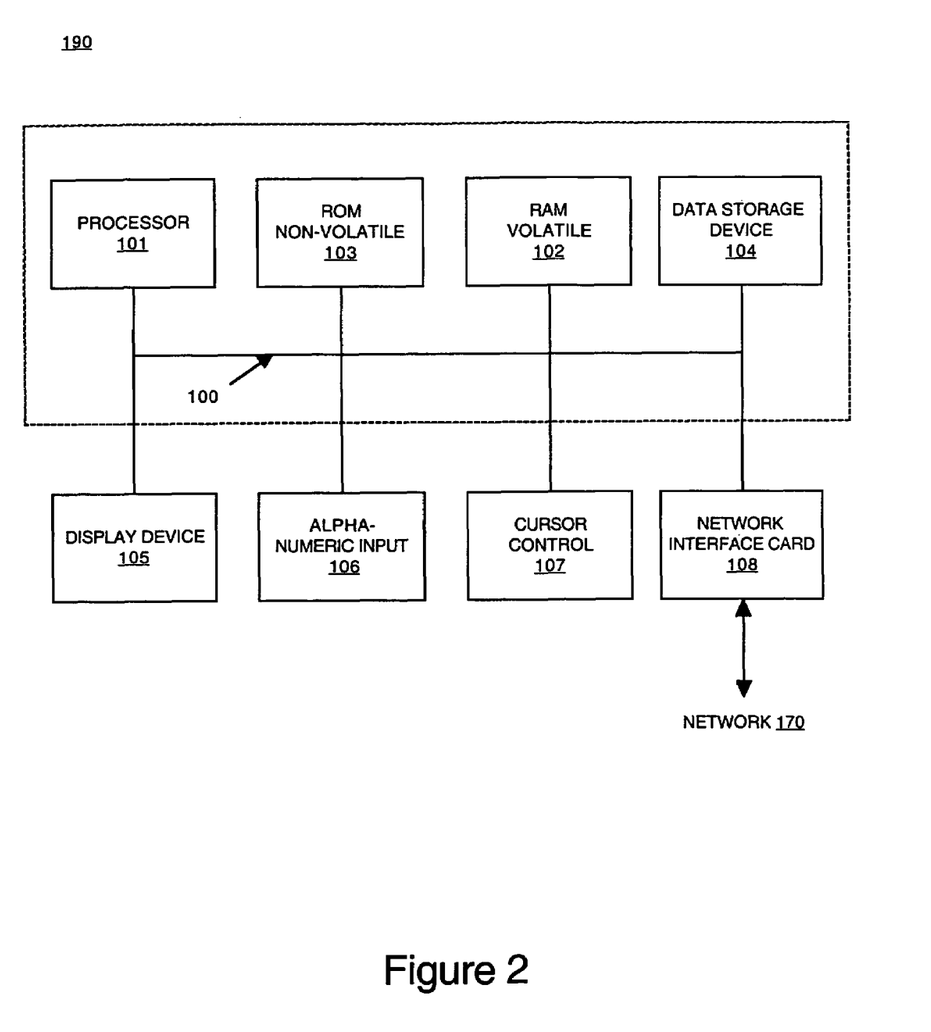
FIG. 2 is a block diagram of an exemplary computer system upon which embodiments of the present invention may be practiced.

Refer now to FIG. 2 which illustrates an exemplary computer system 190 upon which embodiments of the present invention may be practiced. Computer system 190 may be utilized as a server computer system on the World Wide Web (WWW). In general, computer system 190 of FIG. 2 comprises bus 100 for communicating information, processor 101 coupled with bus 100 for processing information and instructions, random access (volatile) memory 102 coupled with bus 100 for storing information and instructions for processor 101, read-only (non-volatile) memory 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, a network interface card (NIC) 108 is used to couple computer system 190 to a network 170 (e.g., the Internet).

With reference still to FIG. 2, optional display device 105 utilized with computer system 190 may be a liquid crystal device, cathode ray tube, or other display device suitable for creating graphic images and alphanumeric characters recognizable to the user. Optional cursor control device 107 allows the computer user to dynamically signal the two-dimensional movement of a visible symbol (pointer) on a display screen of display device 105. Many implementations of the cursor control device are known in the art including a trackball, mouse, joystick or special keys on optional alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 3A:
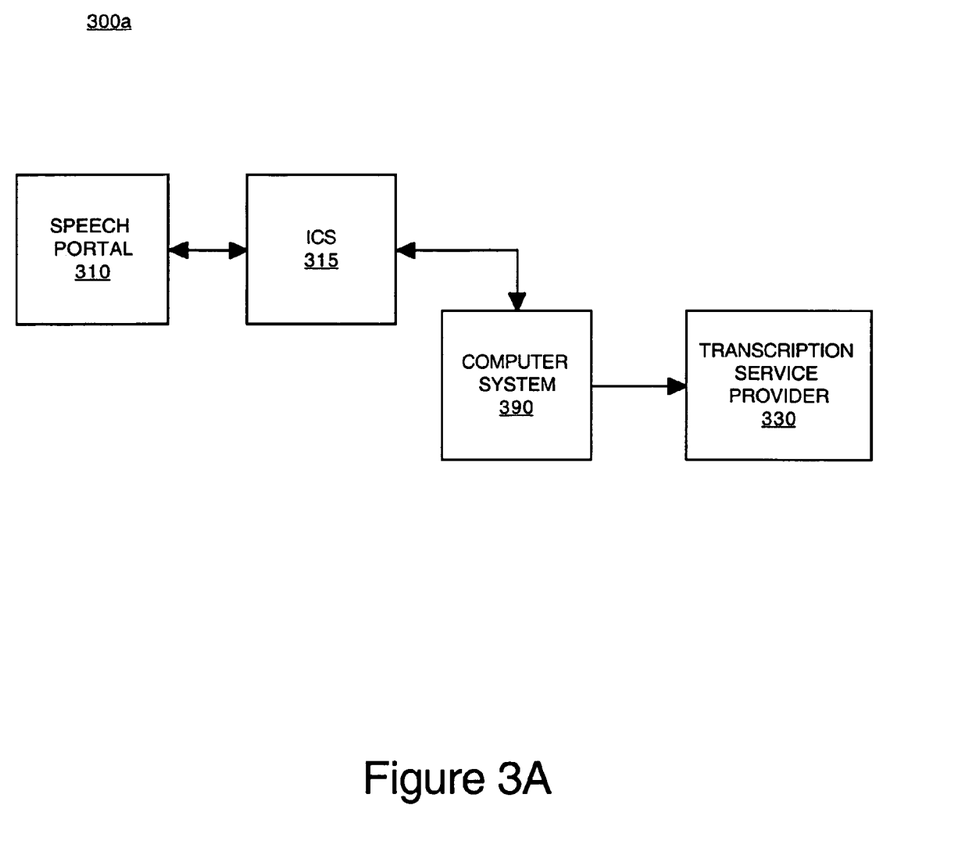
FIG. 3A is a block diagram illustrating an exemplary system architecture for capturing and transcribing information in accordance with one embodiment of the present invention.

FIG. 3A is a block diagram illustrating an exemplary system architecture 300a for capturing and transcribing information in accordance with one embodiment of the present invention. In one embodiment, speech portal 310 (e.g., a telephone) is communicatively coupled to an intelligent communication server (ICS) 315 operated by, for example, a Common (or Competitive) Local Exchange Carrier (CLEC). In turn, ICS 315 can be communicatively coupled to computer system 390 (e.g., a Web server), and computer system 390 can be communicatively coupled to transcription service provider 330.

It is appreciated that the present invention is well-suited for use with any number of speech portals, intelligent communication servers operated by different CLECs, computer systems, Web servers, and transcription service providers. It is further appreciated that, in addition to computer system 390, other servers such as a database server and a file server can be utilized. Thus, the present invention can be readily scaled up in size.

Various known mechanisms can be used for coupling each of the devices in system architecture 300a. For example, some or all of the devices can be communicatively coupled using any network protocol that supports a network connection, such as Internet Protocol, TCP (Transmission Control Protocol), and HyperText Transfer Protocol (HTTP). Some or all of the devices can alternatively be coupled using a serial bus (e.g., RS232 or IEEE 1394), a parallel bus, a Universal Serial Bus (USB), or any other type of workable connection. It is also appreciated that wireless connections can also be used to communicatively couple the devices.

In the preferred embodiment, ICS 315 is communicatively coupled to computer system 390, and computer system 390 to transcription service provider 330, via the Internet or WWW. Communication between ICS 315 and computer system 390 can use Voice Extensible Markup Language (VXML) as well as other types of markup languages.

In one embodiment, speech portal 310 may be a conventional telephone or other such device. That is, in accordance with the present invention, custom equipment having special features and functions is not needed.

In the present embodiment, ICS 315 functions to provide access to a public switched telephone network (PSTN) and to route incoming calls to their proper destinations. ICS 315 also functions to receive and digitize information into voice files, and to forward the voice files to computer system 390 via the Internet. In one embodiment, ICS 315 includes a POP (Point of Presence) server. By using the Internet to forward the voice files, the number of ports available for receiving telephone connections is substantially increased relative to the prior art. Accordingly, a larger number of users can be recording information at any one time.

In one embodiment, computer system 390 is a server on the WWW. As such, computer system 390 is exemplified by computer system 190 of FIG. 2.

With reference still to FIG. 3A, in one embodiment, transcription service provider 330 is a computer system or other such device (e.g., a word processor) that can be coupled to the Internet, receive and play voice files, and send voice files and transcript files (that is, a file containing the transcribed version of a voice file). As such, transcription service provider is also exemplified by computer system 190 of FIG. 2.

In accordance with the present embodiment of the present invention, a user accesses ICS 315 via speech portal 310 (e.g., using a telephone). In one embodiment, ICS 315 recognizes that the incoming call is for transcription services based on the telephone number used to access ICS 315. However, it is appreciated that other mechanisms may be used to identify that the incoming call is for transcription services; for example, the user may identify the need for such services in response to a prompt.

ICS 315 is exemplified by computer system 190 of FIG. 2. In the present embodiment, ICS 315 notifies computer system 390 of the incoming call. In accordance with the present invention, ICS 315 contacts computer system 390 via the Internet by executing the Uniform Resource Locator (URL) for computer system 390. In one embodiment, computer system 390 sends, via the Internet, a set of instructions to ICS 315 for implementing a user interface. In another embodiment, the instructions are cached by ICS 315 after they are received from computer system 390, so that the instructions do not have to be sent each time they are needed. It is appreciated that the instructions can be updated as needed using a variety of techniques; for example, the updates can occur automatically at a prescribed time or time interval, under the direction of either ICS 315 or computer system 390.

Continuing with reference to FIG. 3A, in the present embodiment, ICS 315 executes the user interface prescribed by the instructions from computer system 390. The user interface includes an audio message providing greetings, prompts, menus and options to guide the user through the dictation process. In one embodiment, the user interface allows the caller (user) to identify the subject and the type of work that describe the information to be transcribed, so that the recorded voice file can be forwarded to the appropriate transcriber (e.g., a transcriber having expertise in that subject or type of work). The user interface also allows the caller to identify the priority for having the recorded information transcribed (e.g., urgent or not).

Once the user has been identified, the user interface can be customized according to predefined user preferences. For example, additional instructions defining a custom user interface can be provided to ICS 315 by computer system 390.

In accordance with the present embodiment of the present invention, recorded information is digitized (e.g., analog-to-digital conversion) by ICS 315. The resultant voice file is forwarded to computer system 390 via the Internet. The voice file is added to a queue when there are multiple voice files. The voice files can be sorted according to priority, type of work, subject matter, and the like.

Computer system 390 then sends the voice file to transcription service provider 330, either automatically or in response to a request from transcription service provider 330. Because the voice files are forwarded by computer system 390 to transcription service provider 330 via the Internet, there are no limitations associated with the number of ports available to transcribers. As a result, a much larger number of transcribers can be receiving voice files at any one time.

As an electronic file, the voice file can be quickly and conveniently routed to the appropriate transcription service provider 330, and then to an individual transcriber. In one embodiment, the voice file is compressed so it can be transferred more quickly. In one embodiment, the voice file is automatically downloaded to transcription service provider 330.

Figure 3B:
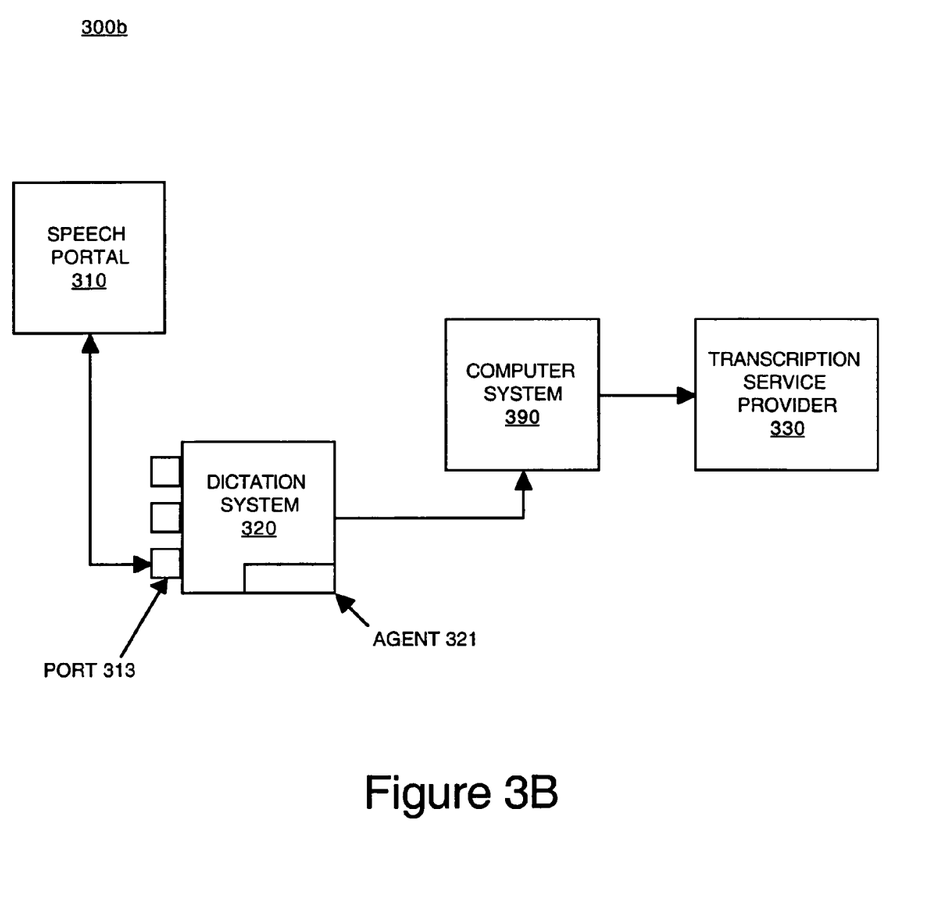
FIG. 3B is a block diagram illustrating an exemplary system architecture for capturing and transcribing information with a legacy device in accordance with another embodiment of the present invention.

FIG. 3B is a block diagram illustrating an exemplary system architecture 300b for capturing and transcribing information with a legacy device 320 in accordance with another embodiment of the present invention. In this embodiment, speech portal 310 is coupled through one of the ports 313 to dictation system 320. In turn, dictation system 320 can be communicatively coupled to computer system 390, and computer system 390 can be communicatively coupled to transcription service provider 330. It is appreciated that the present invention is well-suited for use with any number of speech portals, dictation systems, computer systems, and transcription service providers. In the preferred embodiment, dictation system 320 is communicatively coupled to computer system 390, and computer system 390 to transcription service provider 330, via the Internet or WWW.

In the present embodiment, dictation system 320 is modified to integrate it with the Internet. In the present embodiment, recorded information is digitized (e.g., analog-to-digital conversion) by dictation system 320. In one embodiment, an application or agent 321 is resident on dictation system 320. Agent 321 forwards new voice files to computer system 390. It is appreciated that agent 321 can instead reside on a computer system coupled to dictation system 320.

Accordingly, dictation system 320 can send voice files to computer system 390 via the Internet instead of through one of its ports (e.g., port 313). As such, the ports of dictation system 320 can be dedicated to receiving calls from users wishing to dictate information; it is not necessary for ports to be used by transcribers seeking to access recorded information. Thus, more ports are made available to users allowing more users to record information at the same time.

Figure 4:
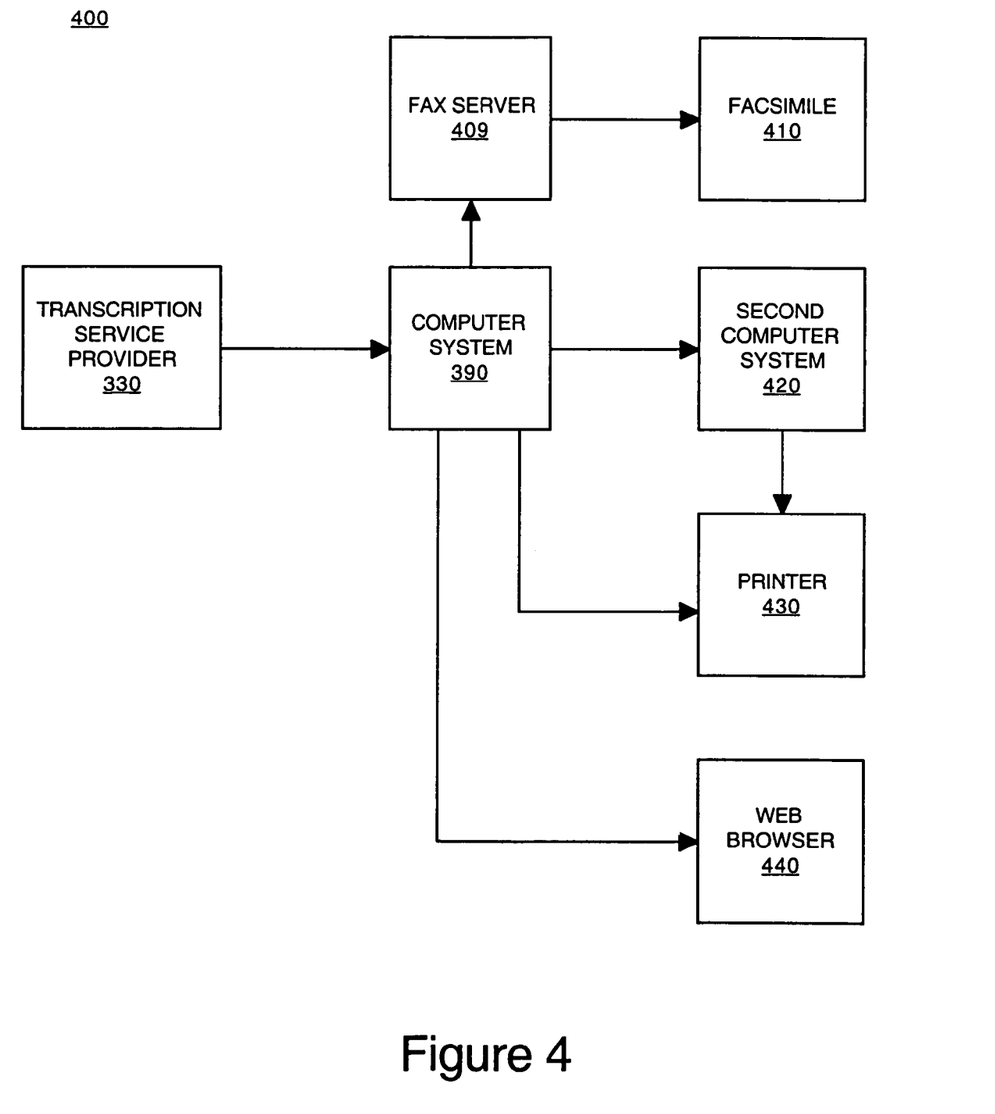
FIG. 4 is a block diagram illustrating an exemplary system architecture for distributing transcribed information in accordance with one embodiment of the present invention.

FIG. 4 is a block diagram illustrating one embodiment of an exemplary system architecture 400 for distributing transcribed information in accordance with the present invention. In the present embodiment, transcription service provider 330 is communicatively coupled to computer system 390, which can be communicatively coupled to facsimile (fax) 410, a second computer system 420, a printer 430, a Web browser 440, and/or other like devices that have the function and capability for printing and/or displaying transcribed information. In one embodiment, second computer system 420 may be a text server coupled to printer 430. The devices in system architecture 400 can be communicatively coupled using the various mechanisms described above in conjunction with FIGS. 3A and 3B. In a preferred embodiment, the devices in system architecture 400 are communicatively coupled via the Internet or WWW.

Referring still to FIG. 4, transcription service provider 330 returns to computer system 390 a transcript file providing a transcribed version of the voice file. In one embodiment, the transcript files are automatically uploaded to computer system 390 via the Internet. In various embodiments, the transcript files can be formatted according to conventional word processing applications (such as Microsoft Word), XML (Extensible Markup Language), or HL7.

The transcribed information can be provided by computer system 390 to the end user in a variety of different ways. In one embodiment, the transcribed information can be sent to facsimile (fax) 410 via fax server 409 and printed. In another embodiment, the transcribed information can be sent to a text server (e.g., second computer system 420) or a printer 430 for printing. In yet another embodiment, the transcribed information can be displayed on a computer system (e.g., second computer system 420) or on a Web browser 440 by opening the transcript file. In addition, in one embodiment, the transcript file can be integrated into an end user information system (for example, for medical records, the transcribed information can be integrated into a Hospital Information System).

In one embodiment, the transcript file can be viewed by accessing a Web site on computer system 390 and displaying the transcribed information on a remote computer system such as second computer system 420. In addition, the transcript file can be viewed on a portable device such as a palmtop or handheld computer system, a Web pad, a mobile phone with display capability, a pager with display capability, as well as other types of devices having a display capability. Furthermore, the Web site on computer system 390 can also provide information regarding the status of each of the various voice files in process.

In addition, the voice file can be sent to a device (e.g., second computer system 420 or Web browser 440) that has the capability to make the voice file audible to a user. As such, the user can listen to the voice file while reviewing (e.g., proofreading) a printed or displayed version of the transcribed information.

The present invention thus provides a centrally manageable and accessible system (e.g., system architectures 300a, 300b and 400) for capturing, transcribing, and delivering information. Accordingly, the transcription system of the present invention can be accessed from virtually any location.

Figure 5A:
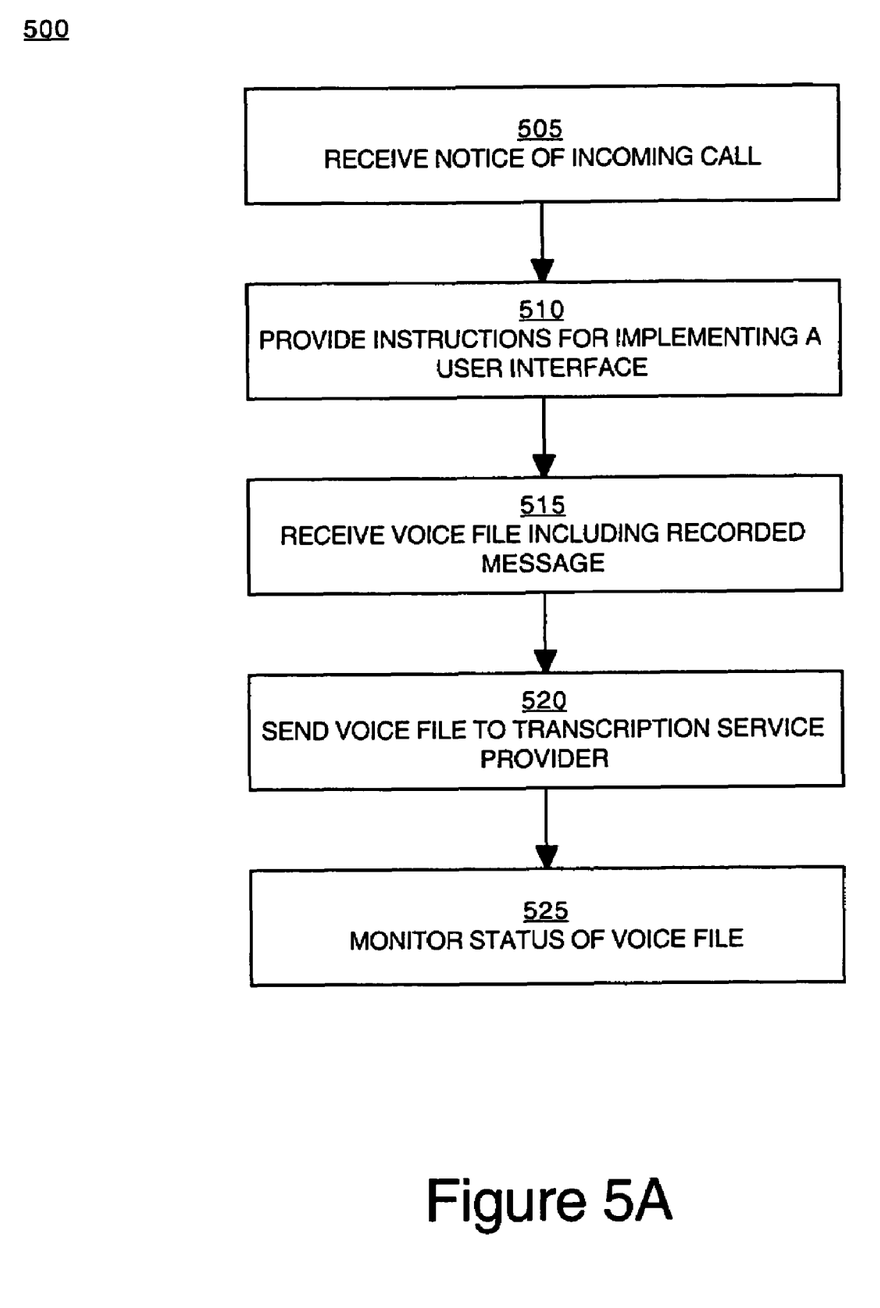
FIG. 5A is a flowchart of the steps in a process for capturing and transcribing information in accordance with one embodiment of the present invention.

FIG. 5A is a flowchart of the steps in a process 500 for capturing and transcribing information in accordance with one embodiment of the present invention. In accordance with the present invention, process 500 can be implemented via computer-readable program instructions stored in a memory unit (e.g., random access memory 102, read-only memory 103, and/or data storage device 104) and executed by processor 101 of computer system 190 (FIG. 2) in a network of devices (e.g., system architectures 300a and 300b of FIGS. 3A and 3B, respectively). In a preferred embodiment, process 500 is implemented on computer system 390 of FIG. 3.

In one embodiment, in step 505 of FIG. 5A and with reference also to FIGS. 3A and 3B, computer system 390 receives notice from ICS 315 of an incoming call requesting transcription services. In the present embodiment, computer system 390 receives this notification via the Internet. Alternatively, the incoming call may be made to dictation system 320 via port 313; in this case, computer system 390 may not receive notification of the incoming call as described in step 505.

In step 510, in the present embodiment, computer system 390 provides instructions to ICS 315 (specifically, to a POP server resident on ICS 315). In one embodiment, the instructions are provided responsive to step 505. In another embodiment, the instructions are provided beforehand and cached by ICS 315. The instructions from computer system 390 are for implementing a user interface between ICS 315 and the caller. The instructions are first used to provide a greeting and to request information identifying the caller, for example. Once the caller is identified, subsequent instructions are used to customize the user interface according to predefined user preferences. Additional information is provided in conjunction with FIG. 5B.

In the case in which the incoming call is received by dictation system 320 instead of ICS 315, instructions implementing a user interface may not be provided as described in step 510; instead, a standard user interface may be used. In either case, the user interface guides the caller through the dictation process, and information dictated by the caller is digitized in a voice file.

In step 515, in the present embodiment, the voice file is received at computer system 390 from ICS 315 or from dictation system 320 via the Internet.

In step 520, in the present embodiment, the voice file is sent over the Internet to transcription service provider 330 for transcribing. The voice file can be automatically forwarded via the Internet to transcription service provider 330, or provided in response to a request from transcription service provider 330.

In step 525, in one embodiment, the status of the voice file can be monitored. Because the voice files all pass through computer system 390, the time at which they arrive, the time that they are forwarded to transcription service provider 330, and the time that they are returned (as transcript files) can be noted. As such, a user can access computer system 390 (specifically, a Web site residing on computer system 390 and identified by a URL) to determine the status of the information (voice file) the user had recorded. In addition, the voice file can be stored on computer system 390 for a specified period of time, so that a user can access and listen to the file (using applicable security safeguards).

Figure 5B:
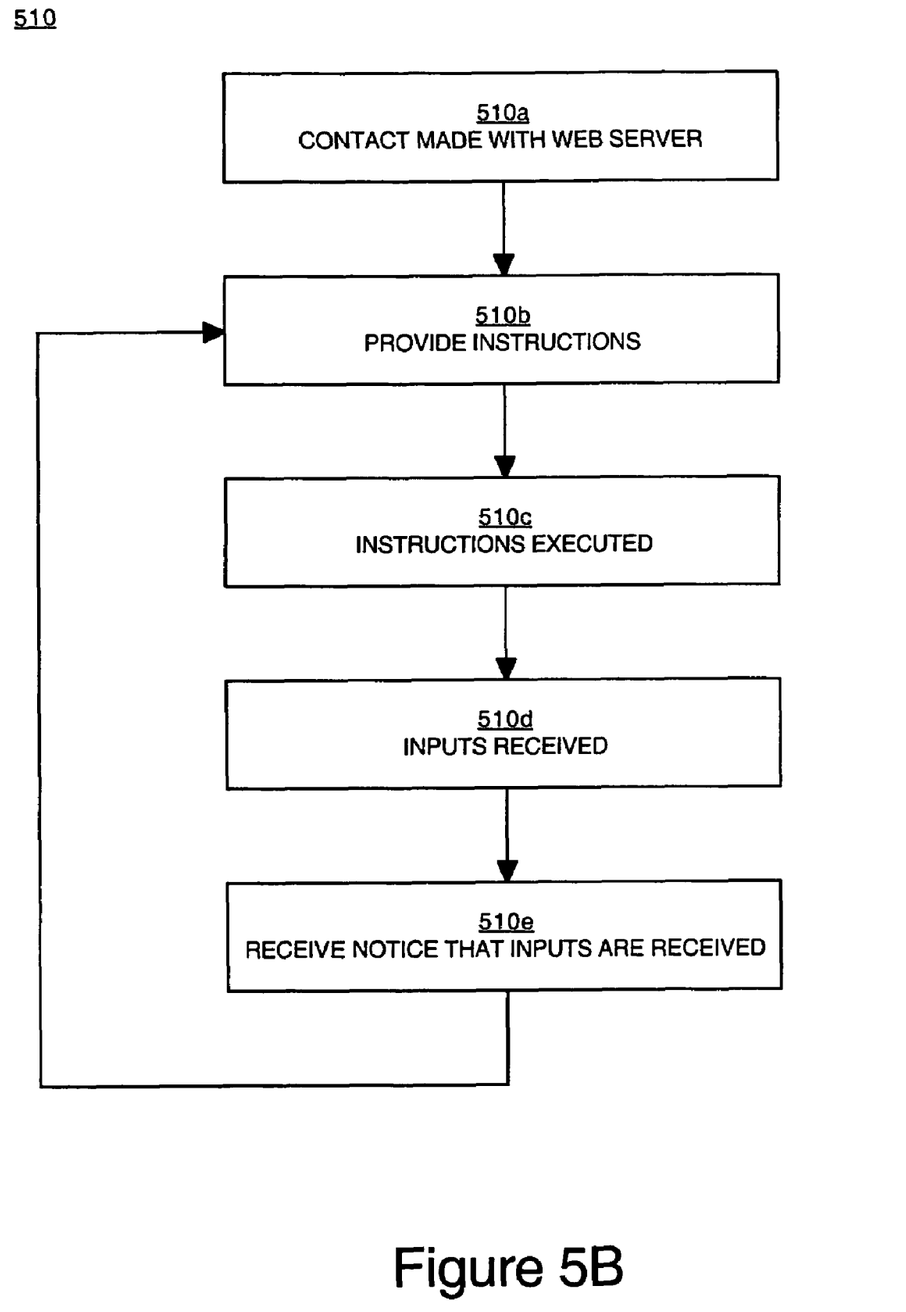
FIG. 5B is a flowchart of the steps in a process for providing instructions to implement a user interface in accordance with one embodiment of the present invention.

FIG. 5B is flowchart providing additional information with regard to step 510 of FIG. 5A. In step 510a of FIG. 5B, a caller (e.g., a dictator) contacts the Web server (e.g., computer system 390) via ICS 315 (FIG. 3A) as described above.

In step 510b of FIG. 5B, computer system 390 provides a set of instructions to the caller (specifically, to a POP server residing on ICS 315). The first set of instructions that are provided pertain to a greeting and a request for information (e.g., a password) used for identifying the caller. Subsequent sets of instructions are used to customize the user interface according to user preferences, to facilitate the recording, and the like.

In step 510c, the instructions received from computer system 390 are executed by the POP server (ICS 315). In step 510d, inputs responsive to the executed instructions are received from the caller. In step 510e, notice is provided by the POP server to computer system 390 that the expected inputs have been received. Accordingly, the next set of instructions are sent from computer system 390 to ICS 315 (specifically, to the POP server). If there are no further instructions required, the process ends.

In general, according to step 510, sets of instructions are sent by computer system 390 to ICS 315, and executed by the POP server resident on ICS 315. A set of inputs in response to the instructions is expected, and when the expected inputs are received, notice is provided by ICS 315 to computer system 390. Accordingly, the next set of instructions can be sent and executed, until all pertinent instructions have been executed and the associated inputs received.

In accordance with the present invention, instructions can be readily changed on computer system 390. The instructions can be changed prior to a connection with computer system 390, or they can be changed in response to user input.

Figure 6:
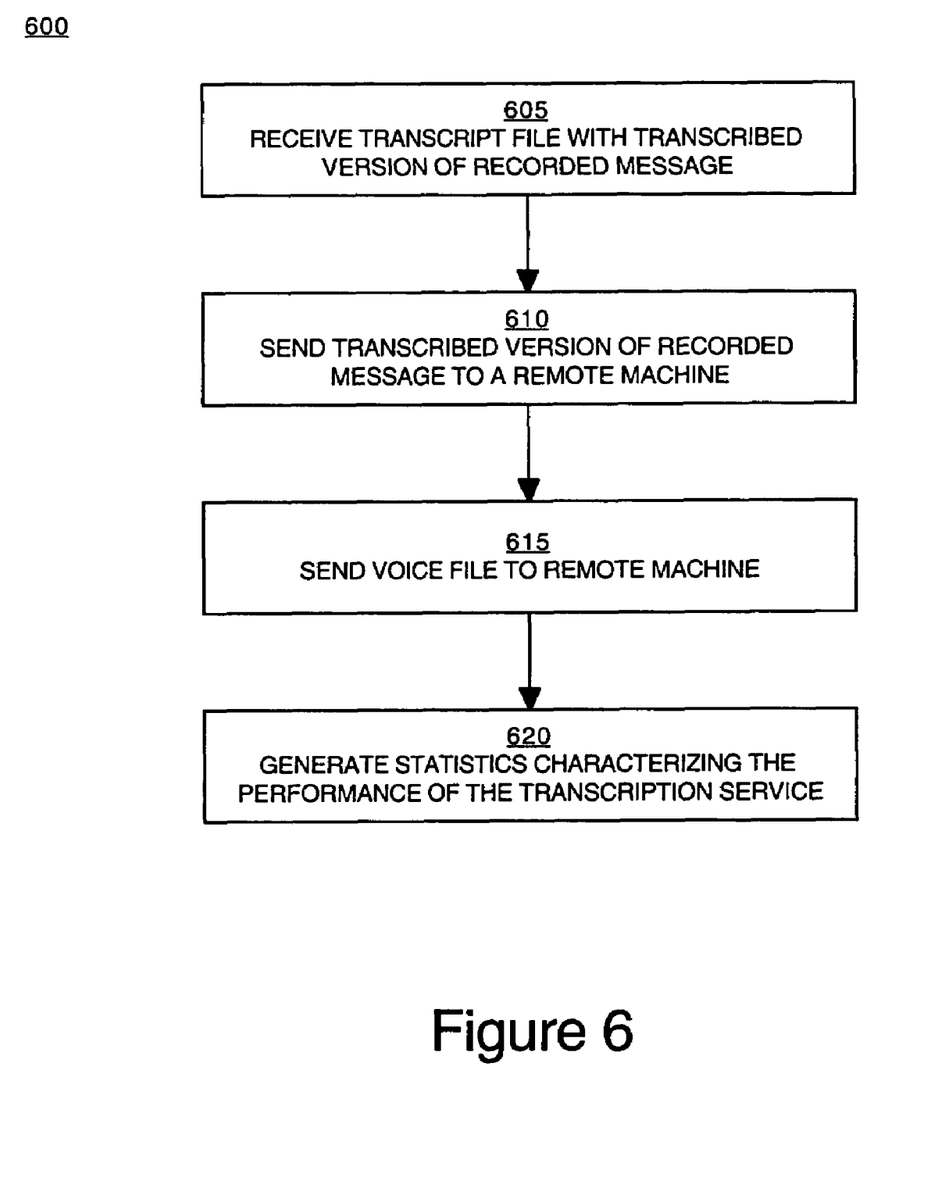
FIG. 6 is a flowchart of the steps in a process for distributing transcribed information in accordance with the present invention.

FIG. 6 is a flowchart of the steps in a process 600 for distributing transcribed information in accordance with the present invention. In accordance with the present invention, process 600 can be implemented via computer-readable program instructions stored in a memory unit (e.g., random access memory 102, read-only memory 103, and/or data storage device 104) and executed by processor 101 of computer system 190 (FIG. 2) in a network of devices (e.g., system architecture 400 of FIG. 4). In a preferred embodiment, process 600 is implemented on computer system 390 of FIG. 4.

In step 605 of FIG. 6, with reference also to FIG. 4, in the present embodiment, computer system 390 receives via the Internet a transcript file from transcription service provider 330. In one embodiment, the transcript files are automatically uploaded to computer system 390 via the Internet. Consequently, a user can access computer system 390 (specifically, a Web site residing on computer system 390 and identified by a URL) to view the transcript file. As described previously, the voice file associated with the transcript file can also be accessed on computer system 390, so that the voice file can be listened to while the transcript file is displayed.

In step 610, the transcript file can be can be provided to the end user by computer system 390 in a variety of different ways. In one embodiment, the transcribed information can be sent to facsimile 410 and printed thereon. In another embodiment, the transcribed information can be sent to a text server (e.g., second computer system 420) or a printer 430 for printing. In yet another embodiment, the transcribed information can be sent to a computer system (e.g., second computer system 420 or Web browser 440) for display or for integration into an information system.

In step 615, in one embodiment, the voice file is also be sent via the Internet by computer system 390 to a device that has the capability to make the voice file audible (e.g., second computer system 420 or Web browser 440).

In step 620, in one embodiment, statistics are generated to characterize the performance of the transcription service. As described above in conjunction with FIG. 5A (step 525), voice files and transcript files can be time-stamped as they pass through computer system 390. Thus, the amount of time needed to transcribe voice files can be tracked, and alerts and notifications can be generated in case the time for completing a transcription approaches the expected delivery time. In addition, it is possible to track whether or not a voice file has been transcribed, reducing the possibility that a file may be overlooked. Furthermore, the amount of recorded information (e.g., the size of the various voice files) not yet transcribed can be readily determined, so that workloads can be more conveniently managed.

The present invention thus provides a method and system that can reduce the costs associated with the purchase, operation and maintenance of prior art dictation devices and appurtenant equipment. The present invention also provides a method and system that can accommodate a large and growing number of users without substantial additional costs.

The preferred embodiment of the present invention, transcription application infrastructure and methodology, is thus described. While the present invention has been described in particular embodiments, it should be appreciated that the present invention should not be construed as limited by such embodiments, but rather construed according to the following claims.

What is claimed is:

1. A method for capturing and transcribing information from a voice file, said method comprising:
providing instructions from a Web server to a first remote device via the Internet, wherein said instructions are for implementing a user interface according to user preferences, said user interface comprising an audible message that is accessed via a speech portal to guide a user through a process for transmitting a voice file for transcription;
receiving at said Web server via the Internet a voice file from said first remote device from said user, said voice file comprising digitized data representing a recorded message that is recorded using said speech portal;
sending said voice file from said Web server to a remote transcription service provider via the Internet;
receiving at said Web server via the Internet a transcript file from said remote transcription provider, said transcript file comprising a transcribed version of said recorded message;
generating a statistical metric at the Web server at least partially as a function of a level of performance of said remote transcription provider relating to transcribing said recorded message into said transcript file; and
managing a transcription workload of said remote transcription provider as a function of said statistical metric.

2. The method as recited in claim 1 wherein said information is a medical record.

3. The method as recited in claim 1 wherein said voice file is received from a computer system communicatively coupled to a telephone, wherein said recorded message is recorded by said computer system from said telephone and wherein said recorded message is digitized by said computer system.

4. The method as recited in claim 1 wherein said voice file is received from a dictation device communicatively coupled to a telephone, wherein said recorded message is recorded by said dictation device from said telephone and wherein said recorded message is digitized by said dictation device, and wherein said voice file is received from said dictation device without using a port of said dictation device.

5. The method as recited in claim 1 further comprising:
monitoring status of a voice file.

6. The method as recited in claim 1 comprising:
sending said transcript file to at least one of a facsimile machine; a remote device operable to print said transcript file; a remote device operable to display said transcript file; or a remote device operable to make said voice file audible.

7. The method as recited in claim 1 wherein the performance metric is selected from the group consisting of: a portion of said voice file waiting to be transcribed; and an amount of time relating to transcribing said voice file.

8. The method as recited in claim 1, further comprising:
associating a time stamp with said voice file,
wherein said statistical metric is generated as a function of said time stamp.

9. The method as recited in claim 1, further comprising:
monitoring a current time;
monitoring an expected delivery time for delivering said transcript file; and
generating a notification when a duration between said current time and said expected delivery time becomes less than a predefined notification threshold.

10. A computer system comprising:
a bus;
a memory unit coupled to said bus; and
a processor coupled to said bus, said processor for executing a method for capturing and transcribing information from a voice file, said method comprising:
providing instructions to a first remote device via the Internet, wherein said instructions are for implementing a user interface according to user preferences;
receiving via the Internet a voice file from said first remote device from a user, a voice file comprising digitized data representing a recorded message that is recorded using a speech portal;
sending said voice file to a remote transcription service provider via the Internet;
receiving via the Internet a transcript file from said remote transcription provider, said transcript file comprising a transcribed version of said recorded message;
generating a statistical metric at least partially as a function of a level of performance of said remote transcription provider relating to transcribing said recorded message into said transcript file; and
remotely managing a transcription workload of said remote transcription provider as a function of said statistical metric via the Internet.

11. The computer system of claim 10 wherein said information is a medical record.

12. The computer system of claim 10 wherein said voice file is received from a computer system communicatively coupled to a telephone, wherein said recorded message is recorded by said computer system from said telephone and wherein said recorded message is digitized by said computer system.

13. The computer system of claim 10 wherein said voice file is received from a dictation device communicatively coupled to a telephone, wherein said recorded message is recorded by said dictation device from said telephone and wherein said recorded message is digitized by said dictation device, and wherein said voice file is received from said dictation device with using a port of said dictation device.

14. The computer system of claim 10 wherein said method comprises:
monitoring status of a voice file.

15. The computer system of claim 10 wherein said method comprises:
sending said transcript file to at least one of a facsimile machine; a remote device operable to print said transcript file; a remote device operable to display said transcript file; or a remote device operable to make said voice file audible.

16. The computer system of claim 10, wherein said user interface comprises an audible message that is accessed via said speech portal to guide said user through a process for capturing and transmitting said voice file for transcription.

17. The computer system of claim 10, wherein said method further comprises:
associating a time stamp with said voice file,
wherein said statistical metric is generated as a function of said time stamp.

18. The computer system of claim 10, wherein said method further comprises:
monitoring a current time;
monitoring an expected delivery time for delivering said transcript file; and
generating a notification when a duration between said current time and said expected delivery time becomes less than a predefined notification threshold.

19. A computer-usable medium having computer-readable program code embodied therein for causing a computer system to perform a method comprising:
providing instructions to a first remote device via the Internet, wherein said instructions are for implementing a user-interface according to user preferences;
receiving via the Internet a voice file from said first remote device from a user, a voice file comprising digitized data representing a recorded message that is recorded using a speech portal;
sending said voice file to a remote transcription service provider via the Internet;
receiving via the Internet a transcript file from said remote transcription provider, said transcript file comprising a transcribed version of said recorded message;
generating a statistical metric at the Web server at least partially as a function of a level of performance of said remote transcription provider relating to transcribing said recorded message into said transcript file; and
managing a transcription workload of said remote transcription provider as a function of said statistical metric.

20. The computer-usable medium of claim 19 wherein said information is a medical record.

21. The computer-usable medium of claim 19 wherein said voice file is received from a computer system communicatively coupled to a telephone, wherein said recorded message is recorded by said computer system from said telephone and wherein said recorded message is digitized by said computer system.

22. The computer-usable medium of claim 19 wherein said voice file is received from a dictation device communicatively coupled to a telephone, wherein said recorded message is recorded by said dictation device from said telephone and wherein said recorded message is digitized by said dictation device, and wherein said voice file is received from said dictation device without using a port of said dictation device.

23. The computer-usable medium of claim 19 wherein said computer-readable program code embodied therein causes a computer system to perform said method comprising:
monitoring status of a voice file.

24. The computer-usable medium of claim 19 wherein said computer-readable program code embodied therein causes a computer system to perform said method comprising:
sending said transcript file to at least one of a facsimile machine; a remote device operable to print said transcript file; a remote device operable to display said transcript file; or a remote device operable to make said voice file audible.

25. The computer-usable medium of claim 19, wherein said user interface comprises an audible message that is accessed via said speech portal to guide said user through a process for capturing and transmitting said voice file for transcription.

26. The computer-usable medium of claim 19, wherein managing performance comprises managing a transcription workload of said remote transcription provider.

27. The computer-usable medium of claim 19, further comprising:
associating a time stamp with said voice file,
wherein said statistical metric is generated as a function of said time stamp.

* * * * *